United States Patent
Chiang et al.

(10) Patent No.: US 7,840,721 B2
(45) Date of Patent: Nov. 23, 2010

(54) DEVICES WITH MULTIPLE FUNCTIONS, AND METHODS FOR SWITCHING FUNCTIONS THEREOF

(75) Inventors: Chi-Pang Chiang, Taoyuan (TW); Yih-Feng Kao, Taoyuan (TW); Te-Chuan Liu, Taoyuan (TW); Shu-Hung Li, Taoyuan (TW); Pei-Chun Wen, Taoyuan (TW)

(73) Assignee: HTC Corporation, Taoyuan, Taoyuan County (TW)

(*) Notice: Subject to any disclaimer, the term of this patent is extended or adjusted under 35 U.S.C. 154(b) by 239 days.

(21) Appl. No.: 12/153,127

(22) Filed: May 14, 2008

(65) Prior Publication Data
US 2008/0288681 A1 Nov. 20, 2008

(30) Foreign Application Priority Data
May 15, 2007 (TW) ............................... 96117207 A

(51) Int. Cl.
*G06F 3/00* (2006.01)
(52) U.S. Cl. ........................... 710/14; 710/38; 710/316
(58) Field of Classification Search ............... 710/14, 710/17, 18, 107, 108, 200, 316; 455/566, 455/556.2; 345/162, 172–175, 179
See application file for complete search history.

(56) References Cited

U.S. PATENT DOCUMENTS

| | | | |
|---|---|---|---|
| 5,748,974 A | 5/1998 | Johnson | |
| 6,002,999 A * | 12/1999 | Han et al. | 704/201 |
| 6,195,593 B1 * | 2/2001 | Nguyen | 700/97 |
| 6,272,575 B1 * | 8/2001 | Rajchel | 710/301 |
| 6,520,699 B2 * | 2/2003 | Abe | 400/485 |
| 6,725,320 B1 * | 4/2004 | Barenys et al. | 710/316 |
| 6,998,871 B2 * | 2/2006 | Mulligan | 326/37 |
| 7,200,386 B2 * | 4/2007 | Mauro, II | 455/418 |
| 7,429,988 B2 * | 9/2008 | Gonsalves et al. | 345/472 |
| 7,437,448 B1 * | 10/2008 | Kohler et al. | 709/224 |
| 2003/0046401 A1 | 3/2003 | Abbott et al. | |
| 2005/0021851 A1 * | 1/2005 | Hamynen | 709/245 |
| 2005/0130705 A1 * | 6/2005 | Shin | 455/556.2 |
| 2006/0277217 A1 * | 12/2006 | Lehikoinen et al. | 707/200 |
| 2007/0185631 A1 * | 8/2007 | Yeh et al. | 701/36 |

(Continued)

FOREIGN PATENT DOCUMENTS

CN 1416068 A 5/2003

(Continued)

*Primary Examiner*—Khanh Dang
(74) *Attorney, Agent, or Firm*—Birch, Stewart, Kolasch & Birch, LLP

(57) ABSTRACT

Devices with multiple functions and methods for switching functions thereof are provided. The device comprises a plurality of hardware components, a plurality of functional modules, an input device, and a processing module. Each functional module corresponds to one of the functional connecting configurations for the hardware components. The processing module executes one of the functional modules and drives the hardware components according to the functional connecting configuration corresponding to the executed functional module. The processing module determines whether to generate a switch command according to an input command received by the input device. When the switch command is generated, the processing module directly terminates the functional module being currently executed and adjusts to execute another functional module, and drives the hardware components according to the functional connecting configuration corresponding to the functional module to be executed.

19 Claims, 7 Drawing Sheets

U.S. PATENT DOCUMENTS

2007/0266178 A1* 11/2007 Wong et al. .................. 709/246
2008/0018543 A1* 1/2008 Baliarda et al. ............. 343/702
2008/0313382 A1* 12/2008 Nurmi et al. ................. 710/314
2009/0106457 A1* 4/2009 Hillner et al. ................... 710/8

FOREIGN PATENT DOCUMENTS

TW          200504518          3/2004

* cited by examiner

| FS8 | FS3 | FS6 |
| --- | --- | --- |
| FS5 | FS2 | FS1 |
| FS9 | FS4 | FS7 |

| ... | FS2 | FS1 | FS3 | FS5 | FS6 | FS7 | ... |
|---|---|---|---|---|---|---|---|

DEVICES WITH MULTIPLE FUNCTIONS, AND METHODS FOR SWITCHING FUNCTIONS THEREOF

BACKGROUND OF THE INVENTION

1. Field of the Invention

The disclosure relates generally to devices with multiple functions and methods for switching functions thereof, and, more particularly to devices and methods that directly switch among functions according to a single input command, without the use of a common specific menu.

2. Description of the Related Art

Recently, portable devices, such as handheld devices, have become more and more technically advanced and multifunctional. For example, a handheld device may provide a communication capability, a global positioning, an image capturing capability, a computer network terminal, a media playback, and various other functions.

Conventionally, to switch among the functions, a user must first issue a command to exit a current executed function, thus returning to a specific menu. Then, another command is issued via the specific menu to select and execute another function. FIG. 1 illustrates the relationship among functions in conventional handheld devices. As shown in FIG. 1, an operating system 120 is installed in the hardware 110 of the handheld device 100. The operating system 120 can provide a user interface 130, such as a specific menu. The specific menu can be displayed in a display unit (not shown) of the handheld device 100. Users can select one function among function 1 to function n (141~14n) provided by the handheld device 100 via the user interface 130. If the user wants to use another function, the user must first terminate the current function, and return to the user interface 130. Then, the user selects another function via the specific menu of the user interface 130, thus entering an operating interface corresponding to the selected function.

As described, users must issue several commands to accomplish the process of terminating a current function, returning to a specific menu, and re-selecting and executing a new function. The conventional mechanism for switching functions is inconvenient for users. Therefore, the application provides an architecture combining several functional modules, to efficiently and instinctively switch among the functional modules.

BRIEF SUMMARY OF THE INVENTION

Devices with multiple functions and methods for switching functions thereof, and related electronic devices are provided.

An embodiment of a device with multiple functions comprises a plurality of hardware components, a plurality of functional modules, an input device, and a processing module. Each functional module corresponds to one of functional connecting configurations for the hardware components. The processing module executes one of the functional modules and drives the hardware components according to the functional connecting configuration corresponding to the executed functional module. The processing module determines whether to generate a switch command according to an input command received by the input device. When the switch command is generated, the processing module directly terminates the functional module being currently executed and adjusts to execute another functional module, and drive the hardware components according to the functional connecting configuration corresponding to the functional module to be executed.

An embodiment of a device with multiple functions comprises a plurality of functional modules, an input device, and a processing module. The processing module executes one of the functional modules, and determines whether to generate a switch command according to an input command received by the input device. When the switch command is generated, the processing module terminates the functional module being currently executed, and directly switches to execute another functional module, wherein selection for the functional modules via a specific menu is not required.

In an embodiment of a method for switching functions for use in a device comprising a plurality of hardware components, wherein one of a plurality of functional modules is executed thereon, and the hardware components are driven according to one of a plurality of functional connecting configurations corresponding to the executed functional module, an input command is first received, and it is determined whether to generate a switch command according to the input command. When the switch command is generated, the functional module being currently executed is terminated, and another functional module is directly executed. The hardware components are driven according to the functional connecting configuration corresponding to the functional module to be executed.

In an embodiment of a method for switching functions for use in a device comprising a plurality of functional modules, wherein one of the functional modules is executed thereon, an input command is first received, and it is determined whether to generate a switch command according to the input command. When the switch command is generated, the functional module being currently executed is terminated, and another functional module is directly executed, wherein selection for the functional modules via a specific menu is not required.

An embodiment of an electronic device comprises a housing with an opening, a touch-sensitive display, and a processor. The touch-sensitive display is disposed in the opening of the housing to receive at least one input signal. The touch-sensitive display has a touch-sensitive surface, and the surface of the housing does not substantially protrude the touch-sensitive surface. The processor performs the above methods for switching functions according to the input signal, and displays related data in the touch-sensitive display.

Methods for switching functions may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Devices with multiple functions and methods for switching functions thereof, and related electronic devices are provided.

Figure 1:
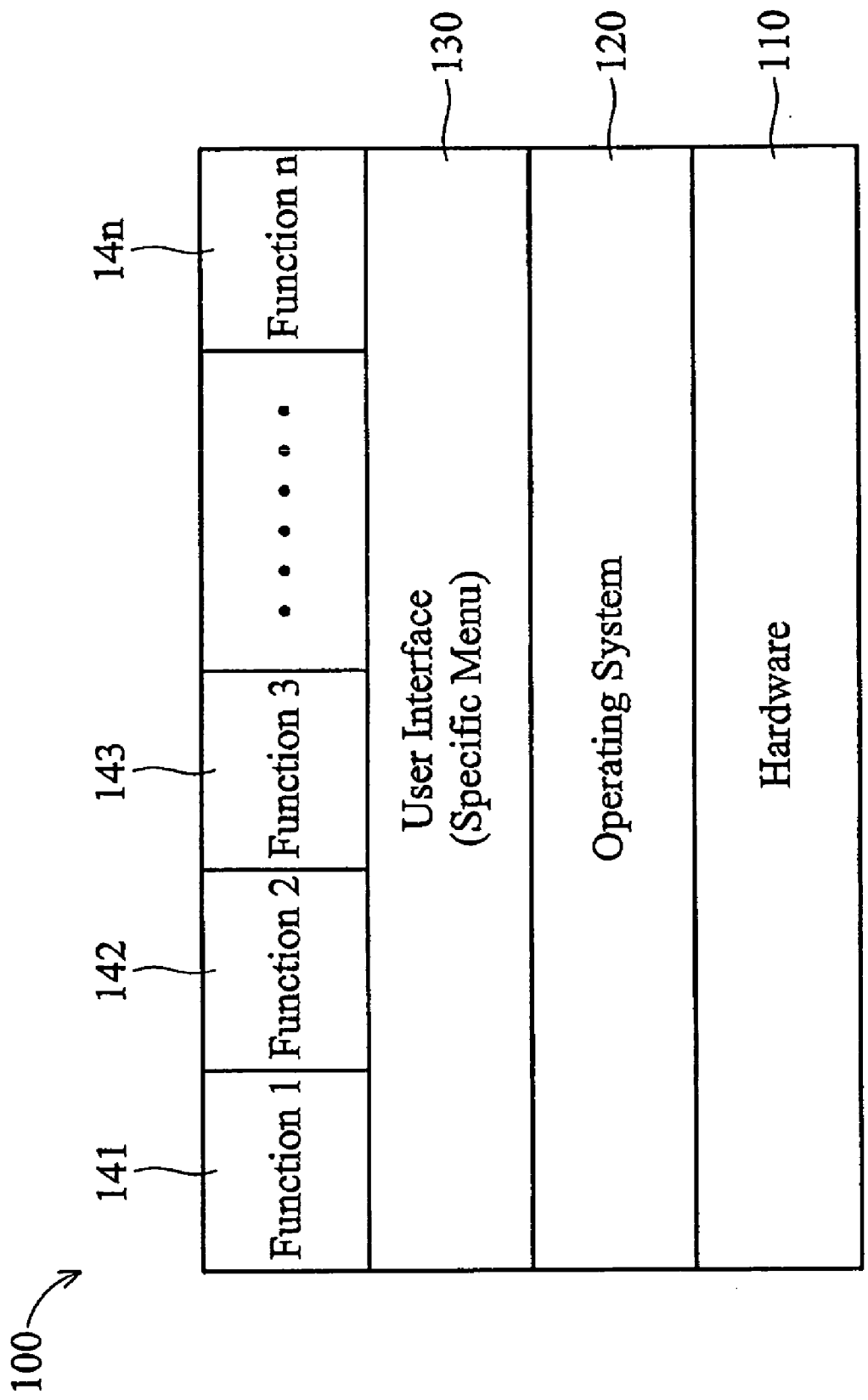
FIG. 1 is a schematic diagram illustrating the relationship among functions in conventional handheld devices.
Figure 2:
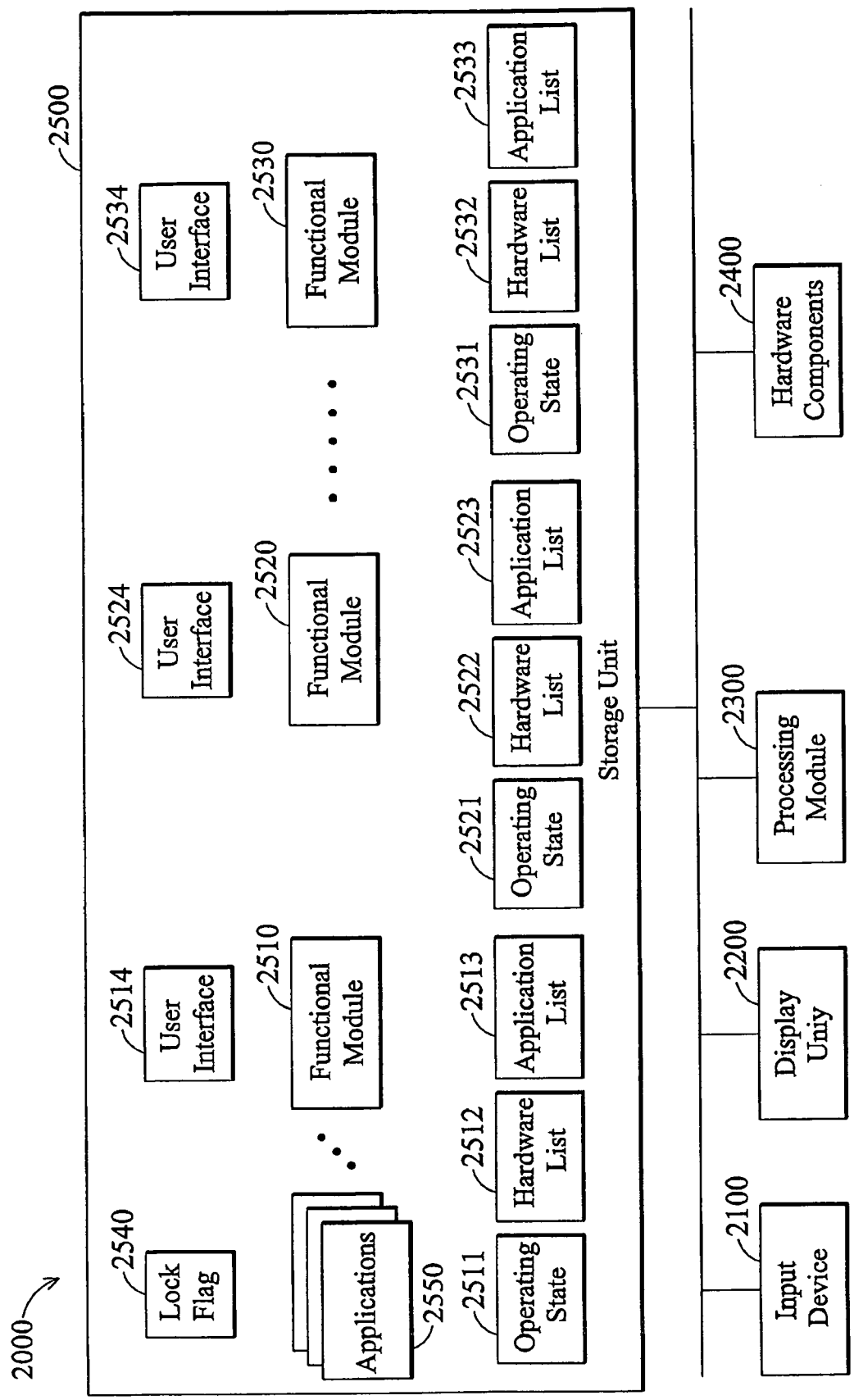
FIG. 2 is a schematic diagram illustrating an embodiment of a device with multiple functions.

FIG. 2 is a schematic diagram illustrating an embodiment of a device with multiple functions.

The device with multiple functions 2000 may be a portable device, such as a handheld device. The device with multiple functions 2000 comprises an input device 2100, a display unit 2200, a processing module 2300, a plurality of hardware components 2400, and a storage device 2500. The input device 2100 may be a touch-sensitive device, a direction sensor, a voice reception unit and/or at least a hot key. The input device 2100 receives an input command. The display unit 2200 may be a screen of the device 2000, for displaying related information generated during operations thereon. The processing module 2300 determines whether to generate a switch command according to the content of the input command. When the switch command is generated, the multiple functions related to the generated switch is performed accordingly. Related detail is discussed later. The hardware components 2400 are hardware resources, such as memory, camera lens, audio processing chipset, global positioning system chipset, antenna, and others resources of the device 2000.

The storage unit 2500 comprises a plurality of functional modules (2510, 2520 and 2530), such as a phone, global positioning system, camera, computer network terminal, and/or media playback, providing communication, global positioning, image capturing, computer network terminal, and/or media playback capabilities, respectively. When one of the functional modules is executed on the device 2000, the device 2000 becomes a specific device having a specific capability corresponding to the executed functional module. For example, when the device 2000 executes the phone functional module, the device 2000 becomes a phone, such as a GSM (Global System for Mobile communications) mobile phone having communication capability. When the device 2000 executes the camera functional module, the device 2000 becomes a camera having image capturing capability. It is noted that, in some embodiments, one functional module may have several capabilities based on different design requirements. For example, the communication and image capturing capabilities can be integrated into one functional module, or the global positioning and media playback capabilities can be integrated into one functional module. It is noted that the above integrations are examples, and not limited thereto.

Each functional module has an operating state, a hardware list comprising a part of the hardware components, an application list, and at least one user interface. For example, the functional module 2510 has an operating state 2511, a hardware list 2512, an application list 2513, and at least one user interface 2514. The functional module 2520 has an operating state 2521, a hardware list 2522, an application list 2523, and at least one user interface 2524. The functional module 2530 has an operating state 2531, a hardware list 2532, an application list 2533, and at least one user interface 2534. The storage unit 2500 further comprises a lock flag 2540, and a plurality of applications 2550. The lock flag 2540 can be used to determine whether to generate a switch command. For example, when the lock flag 2540 is a first value, no switch command is allowed to be generated. That is, the functions related to the switch are not allowed to be called up. When the lock flag 2540 is a second value, a switch command is allowed to be generated. That is, the functions related to the switch are allowed to be called up.

The execution status of a functional module can be recorded into the corresponding operating state. For example, the current execution status of the functional module 2520 can be recorded into the operating state 2521 before the functional module 2520 is terminated. When the functional module 2520 is executed again, it is determined whether the operating state 2521 corresponding to the functional module 2520 exists (whether the operating state 2521 has been recorded). If so, the functional module 2520 is executed under the operating state 2521. In other words, the functional module is resumed to the operating state before the previous termination. For example, when the device 2000 executes a phone functional module, and an address book query is performed, a user can issue a command to the device 2000, enabling the device 2000 to switch to the functional module of a camera. When the camera functional module is terminated, and the user issues a command to the device 2000, enabling the device 2000 to switch to the phone functional module, the device 2000 resumes performing the address book query.

In this application, each functional module corresponds to a functional connecting configuration among the hardware components 2400. The functional connecting configuration can be recorded into the hardware list of the corresponding functional module. In other words, when the functional module 2510 is executed, the hardware components are driven according to the functional connecting configuration in the hardware list 2512. For example, when a camera functional module is executed, the hardware components comprising camera lens and an image processing chipset are driven according to the functional connecting configuration of the camera, and the image processing chipset is enabled to receive and process image signals captured from the camera lens. When a computer network terminal functional module, such as WiFi wireless network, is executed, the hardware components comprising a RF circuit and a network data processing chipset are driven according to the functional connecting configuration of computer network terminal, and the network data processing chipset is enabled to transmit data to the RF circuit, or receive data signals from the RF circuit. In some embodiments, the hardware components can be driven via a common operating system when respective functional modules are executed. In some embodiments, the hardware components can be respectively driven via dedicated operating systems for respective functional modules. That is, the device 2000 may comprise several operating systems.

Additionally, respective applications in the device can be corresponded to at least one of the functional modules. When a functional module is executed, the applications recorded in the application list corresponding to the executed functional module can be called up and used. For example, the application list 2523 corresponding to the functional module 2520 records a part of the applications 2550 so that it can be called up and used during the execution of the functional module 2520. The application list 2533 corresponding to the functional module 2530 records a part of the applications 2550 that can be called up and used during the execution of the functional module 2530. It is understood that the application list 2523 corresponding to the functional module 2520 and the application list 2533 corresponding to the functional module 2530 may overlap. That is, a specific application may be commonly called up and used during the executions of the functional module 2520 and the functional module 2530. For example, an application for downloading maps can be only called up and used by the global positioning system functional module, and an application for setting the device, such as the display and speaker of the device can be called up and used by all functional modules.

Additionally, each functional module may have a corresponding user interface for settings and operations. The user interface can be displayed in the display unit 2200. It is understood that, in some embodiments, each functional module may have a system agent module (not shown) storing the corresponding operating state, hardware list, application list, and user interface. The system agent module is discussed later.

Figure 3:
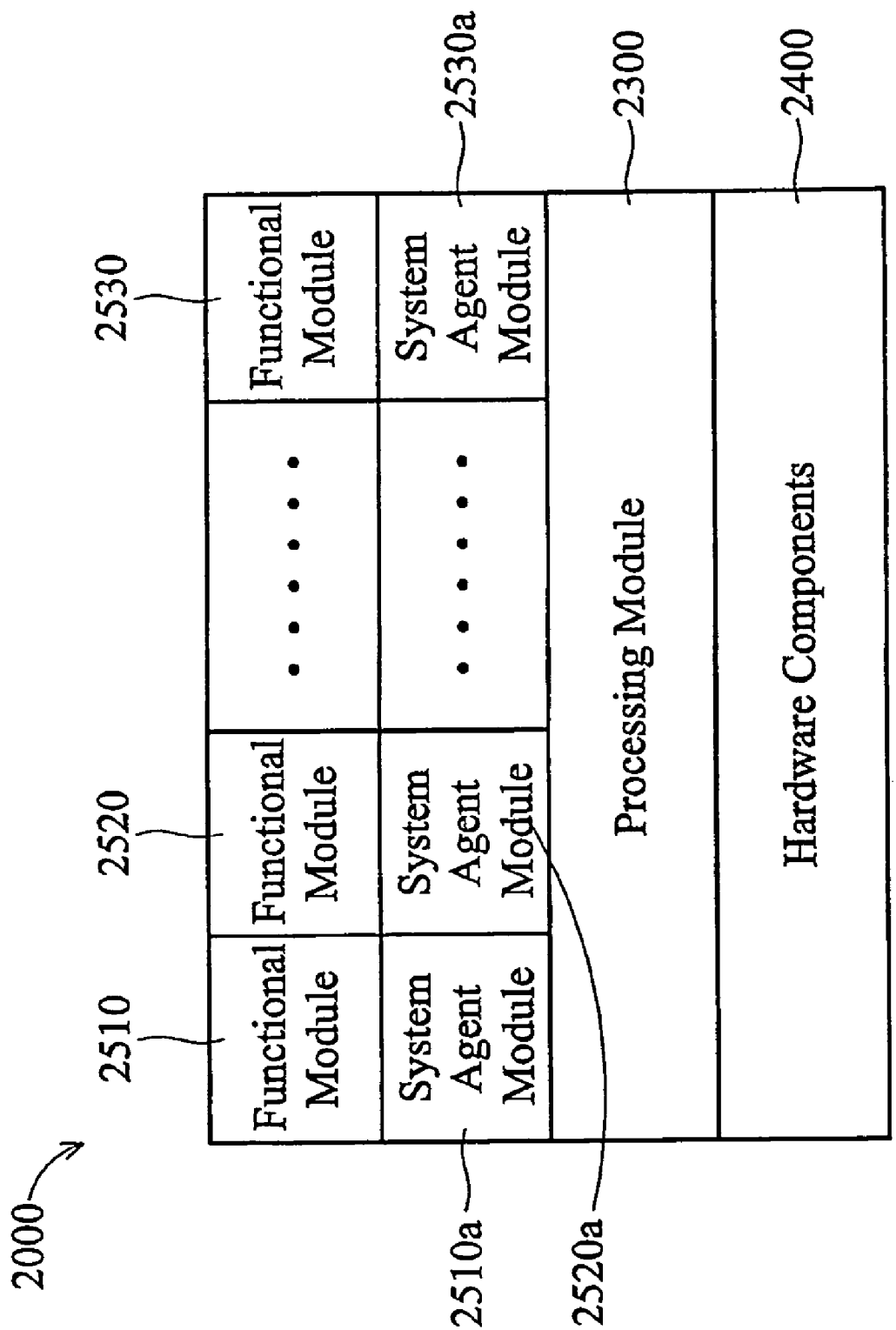
FIG. 3 is a schematic diagram illustrating an embodiment of the relationship among functional modules in a device with multiple functions.

FIG. 3 is a schematic diagram illustrating an embodiment of the relationship among functional modules in a device with multiple functions.

As shown in FIG. 3, the processing module 2300 manages the hardware components 2400 in the device 2000. When the processing module 2300 generates a switch command, a new functional module (second functional module) is directly switched to and executed from a currently executed functional module (first functional module). For example, the device 2000 executes a first functional module 2510, and drives the hardware components 2400 according to a first functional connecting configuration corresponding to the first functional module 2510. When a switch command is generated, which indicates switching to a second functional module 2530, the processing module 2300 stores a current operating state of the first functional module 2510 via a system agent module 2510a. Then, the processing module 2300 executes the second functional module 2530 according to the operating state of the second functional module 2530 via a system agent module 2530a, and drives the hardware components 2400 according to a second functional connecting configuration corresponding to the second functional module 2530 in the hardware list. Additionally, the system agent module 2530a also enables the applications corresponding to the second functional module 2530 to be called up and used according to the application list. It is understood that when the device 2000 is booted, one of the functional modules 2510, 2520 and 2530 is directly executed. In some embodiments, a functional module executed before the device 2000 is turned off and can be resumed for execution when the device 2000 is booted.

Figure 4:
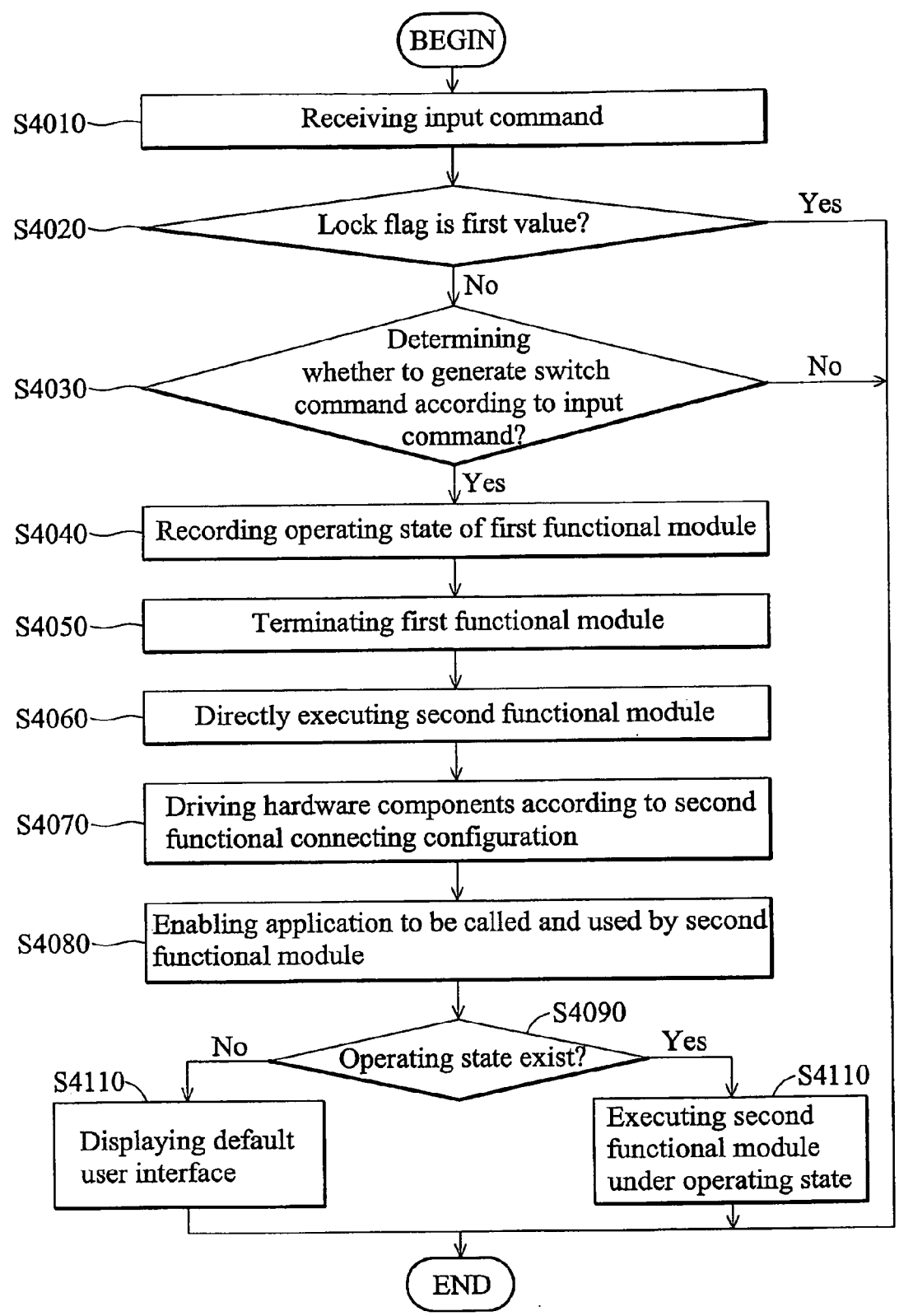
FIG. 4 is a flowchart of an embodiment of a method for switching among functional modules.

FIG. 4 is a flowchart of an embodiment of a method for switching among functional modules of a device, wherein a first functional module is executed on the device and the hardware components of the device is driven according to a first functional connecting configuration corresponding to the first functional module.

In step S4010, an input command is received via an input device. In step S4020, it is determined whether a lock flag is a first value, wherein the first value represents the functional modules related to the switch is not allowed. If so, the procedure is completed. If not, in step S4030, it is determined whether to generate a switch command according to the input command, wherein the switch command enables the device to switch to and execute a second functional module from the first functional module being currently executed.

As described, the input device may be a touch-sensitive device, a direction sensor, a voice reception unit and/or a hot key. In some embodiments, when the input device is a touch-sensitive device, the input command may comprise vector data generated on the surface of the touch-sensitive device.

Figures 5A, 5B, 5C:
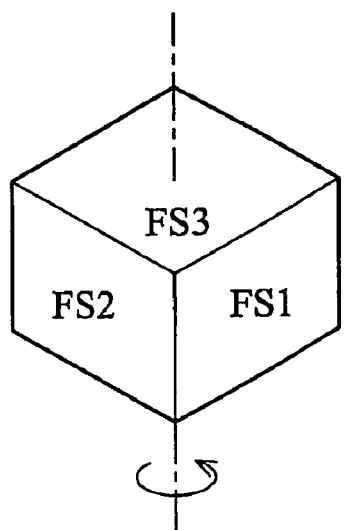
FIGS. 5A, 5B and 5C are schematic diagrams illustrating embodiments of the relationship of relative positions among functional modules.
Figure 6:
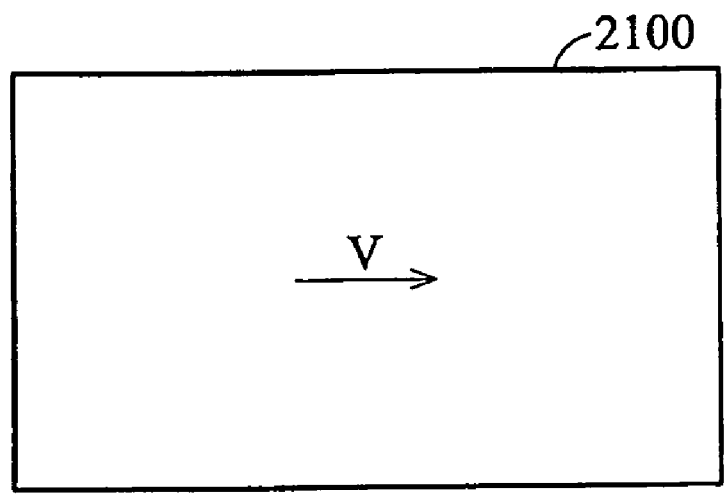
FIG. 6 is a schematic diagram illustrating an embodiment of vector data.

The relationship of relative positions among respective functional modules is defined and recorded in the device. The switch command, which indicates switching to the second functional module, can be determined to be generated according to the relationship of relative positions between the first and second functional modules and the vector data. FIGS. 5A, 5B and 5C are schematic diagrams illustrating embodiments of the relationship of relative positions among functional modules, wherein FIG. 5A shows the relationship of relative positions in a cube manner, FIG. 5B shows the relationship of relative positions in a matrix manner, and FIG. 5C shows the relationship of relative positions in a sequence manner. FS1~FS9 respectively represent different functional modules. When a first functional module FS1 is currently being executed, and the vector data generated on the surface of the touch-sensitive device is from left to right, as the vector data v shown in FIG. 6, a switch command is generated, and the device directly switches to a second functional module FS2 from the first functional module FS1 according to the switch command, and shows a user interface corresponding to the second functional module FS2. It is understood that the vector data may be generated by sliding a track from left to right on the surface of the touch-sensitive device using a user's finger or stylus.

Figure 7:
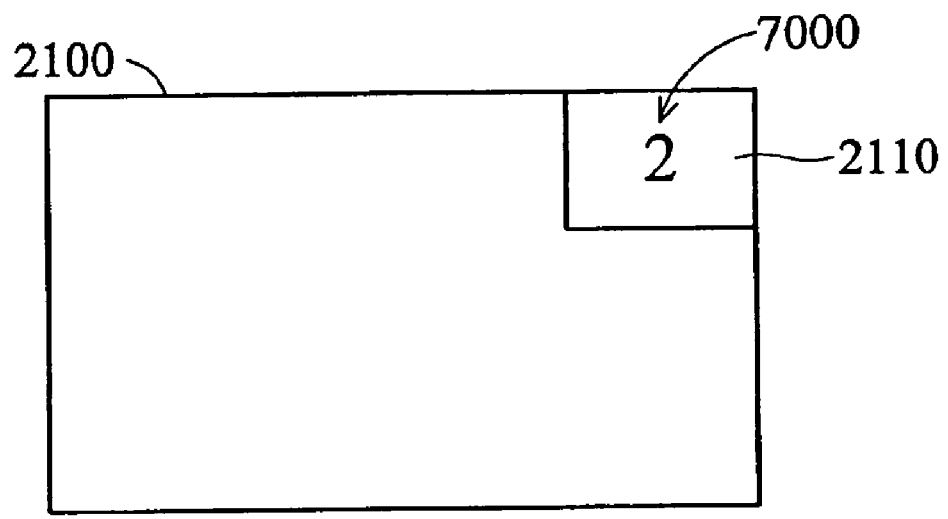
FIG. 7 is a schematic diagram illustrating an embodiment of contact track.

In some embodiments, when the input device is a touch-sensitive device, the input command may comprise a contact track generated on the surface of the touch-sensitive device. It is noted that the contact track may be in a specific zone of the touch-sensitive device. Specific tracks, such as symbols or characters corresponding to respective functional modules are defined and recorded in the device. The switch command, which indicates switching to the second functional module, can be determined to be generated according to the contact track and the specific tracks recorded in the device. For example, assume the specific track corresponding to the first functional module is "1", the specific track corresponding to the second functional module is "2", and the specific track corresponding to the third functional module is "3". When the contact track 7000 generated in a specific zone 2110 of the touch-sensitive device 2100 is "2" as shown in FIG. 7, the processing module will recognize the shape of the contact track to obtain "2", and generate a switch command which indicates switching to the second functional module FS2. Specifically, the device directly switches to the second functional module FS2 according to the switch command.

In some embodiments, when the input device is a direction sensor, a user can move the device along a direction, and the direction data of the device can be detected by the direction sensor. The direction data can be used as the input command. The relationship of relative positions among respective functional modules is defined and recorded in the device. The switch command, which indicates switching to the second functional module, can be determined to be generated according to the relationship of relative positions between the first and second functional modules and the direction data.

In some embodiments, when the input device is a voice reception unit, voice data received by the voice reception unit can be used as the input command. Recognition data corresponding to respective functional modules is defined and recorded in the device. The processing module can recognize the voice data, and determine whether the voice data comprises the recognition data corresponding to the second functional module. If the voice data comprises the recognition data corresponding to the second functional module, the switch command, which indicates switching to the second functional module, is generated.

In some embodiments, when the input device is a hot key, the selection of the hot key can be regarded as the input command. Hot keys corresponding to respective functional modules is defined and recorded in the device. The switch command, which indicates switching to the second functional module, can be determined to be generated by determining whether the received hot key is the predefined hot key corresponding to the second functional module. It is understood that the above input commands and corresponding generation of switch commands are examples, and not limited thereto.

After the second functional module is determined to be executed, in step S4040, the current operating state of the first functional module is recorded, in step S4050, the execution of the first functional module is terminated, and in step S4060, the second functional module is directly executed. It is understood that, in the application, the second functional module can be directly switched to and executed, without selection via a specific menu as in the conventional mechanism. In step S4070, the hardware components of the device are driven according to the second functional connecting configuration corresponding to the second functional module, and in step S4080, the applications corresponding to the second functional module are enabled to be called up and used during the execution of the second functional module according to the application list corresponding to the second functional module. It is noted that in step S4080, the applications that can be called up and used during the execution of the second functional module are set. In step S4090, it is determined whether any operating state corresponding to the second functional module exists. It is understood that, in some embodiments, when the second functional module is initially executed, the operating state corresponding to the second functional module may not exist since the storage of the operating state is performed when the corresponding functional module is terminated. If no operating state exists, in step S4100, a default user interface corresponding to the second functional module is displayed in the display unit. If the operating state corresponding to the second functional module exists, in step S4110, the second functional module is executed under the operating state, enabling the device to resume the execution status of the second functional module before previous termination.

The touch-sensitive device in the above embodiments is a hardware component of an electronic device. In some embodiments, the display unit and the touch-sensitive device can be integrated as a touch-sensitive display, as shown in FIGS. 8A and 8B.

Figure 8A:
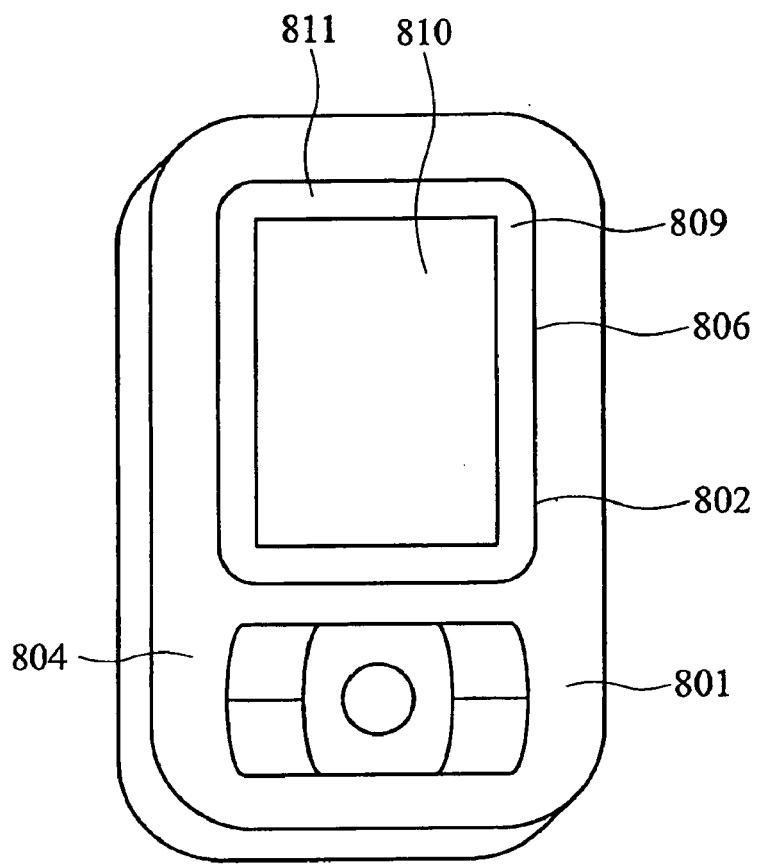
FIG. 8A is a schematic diagram illustrating an embodiment of the front view of an electronic device having a touch-sensitive display.
Figure 8B:
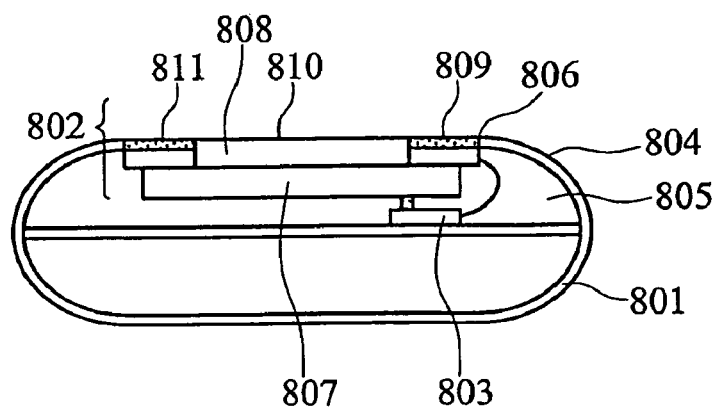
FIG. 8B is a schematic diagram illustrating an embodiment of the cross-sectional view of the electronic device in FIG. 8A.

FIG. 8A is a schematic diagram illustrating an embodiment of the front view of an electronic device having a touch-sensitive display, and FIG. 8B is a schematic diagram illustrating an embodiment of the cross-sectional view of the electronic device in FIG. 8A. The electronic device comprises a housing 801, a touch-sensitive display 802, and a processor 803. The housing 801 has a surface 804 and a cavity 805, wherein the cavity 805 is exposed to the outside from the housing 801 through an opening 806 of the surface 804. The touch-sensitive display 802 comprises a display unit 807 and a touch-sensitive device 808. The display unit 807 is disposed in the cavity 805 of the housing 801. The touch-sensitive device 808 is disposed in the opening 806 of the surface 804 of the housing 801 to receive an input of a pointer such as a user's finger or a stylus, and detect input signals corresponding to contact and movement of the pointer. The touch-sensitive device 808 has a touch-sensitive sensor 809, wherein the touch-sensitive sensor 809 comprises a display area 810 and a non-display area 811. The edge of the opening 806 of the housing 801 is continuously connected with the touch-sensitive sensor 809, and the surface 804 of the housing 801 does not substantially protrude the touch-sensitive sensor 809. A storage device (not shown) storing a computer program can be disposed in the housing 801 or externally coupled to the electronic device. The processor 803 couples to the storage device, the display unit 807, and the touch-sensitive device 808, and processes the input signals according to the computer program for information navigation. It is understood that since the surface 804 of the housing 801 does not substantially protrude the touch-sensitive sensor 809, the surface 804 of the housing 801 and the touch-sensitive sensor 809 can be regarded as a continuous and smooth surface, such that an input tool can move and operate without any obstruction. Similarly, the processor 803 can determine the contact and movement behavior of the input tool according to the input signals detected by the touch-sensitive device 808. The determination procedures and related processes are similar to that in above embodiments.

In the application, several devices with different capabilities can be independently implemented and integrated into a single device with multiple functions, such that the size and number of device hardware can be reduced. Additionally, users can efficiently and instinctively switch among functions implemented by the device.

Methods for switching functions, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A device with multiple functions comprising a plurality of hardware components, comprising:

a storage unit comprising a first functional module, corresponding to a first functional connecting configuration for the hardware components and a second functional module, corresponding to a second functional connecting configuration for the hardware components, wherein the first functional module is generated according to a first hardware list, and the first hardware list records a first set of the hardware components needed to be driven among the hardware components when the first functional module is executed, and the second functional module is generated according to a second hardware list, and the second hardware list records a second set of the hardware components needed to be driven among the hardware components when the second functional module is executed;

an input device, receiving an input command; and a processing module, coupled to the storage unit and the input device, executing the first functional module and driving the first set of the hardware components among the hardware components according to the first functional connecting configuration, and determining whether to generate a switch command according to the input command, wherein when the switch command is generated, the processing module terminates the execution of the first functional module, stopping and releasing the first set of the hardware components among the hardware components, and adjusts to directly execute the second functional module and drive the second set of the hardware components among the hardware components according to the second functional connecting configuration, wherein selection for the functional modules via a specific menu is not required.

2. The device of claim 1, further comprising an operating system, wherein when the first functional module and the second functional module are respectively executed, the hardware components are driven according to the first functional connecting configuration and the second functional connecting configuration, respectively, via the operating system.

3. The device of claim 1, further comprising a plurality of operating systems, wherein when the first functional module and the second functional module are respectively executed, the hardware components are driven according to the first functional connecting configuration and the second functional connecting configuration, respectively, via different operating systems.

4. The device of claim 1, further comprising a plurality of applications, wherein parts or all of the applications correspond to at least one of the first functional module and the second functional module, and when the first functional module and the second functional module are respectively executed, the applications corresponding to the first functional module and the second functional module are enabled to be respectively called up.

5. The device of claim 1, further comprising a display unit and a plurality of user interfaces, wherein each user interface corresponds to one of the first functional module and the second functional module, and the display unit displays the user interface corresponding to the second functional module after the processing module executes the second functional module.

6. The device of claim 1, wherein the processing module further determines whether an operating state corresponding to the second functional module exists, and if so, executes the second functional module under the operating state.

7. The device of claim 1, wherein the processing module further records an operating state corresponding to the first functional module before the first functional module is terminated.

8. The device of claim 1, wherein the processing module comprises a lock flag, and the switch command is not generated if the lock flag is a first value.

9. The device of claim 1, wherein when the input device is a touch-sensitive device, the input command comprises vector data input via the touch-sensitive device, and the processing module generates the switch command according to the vector data; when the input device is a direction sensor, the input command comprises direction data detected by the direction sensor, and the processing module generates the switch command according to the direction data; when the input device is a voice reception unit, the input command comprises voice data received by the voice reception unit, and the processing module generates the switch command according to a specific recognition data comprised in the voice data; and when the input device is at least one hot key, the processing module generates the switch command according to the selection of the hot key.

10. The device of claim 1, wherein the processing module comprises a relationship of a relative position between the first functional module and the second functional module, the input device comprises a direction sensor, the input command comprises direction data detected by the direction sensor, and the processing module generates the switch command when the relationship of the relative position conforms to the direction data.

11. The device of claim 1, wherein operating capabilities for a phone, a global positioning system, a camera, a computer network terminal or a media player are implemented on the device after the first functional module or the second functional module is executed.

12. A device with multiple functions, comprising:

a storage unit comprising a plurality of functional modules, wherein each of the functional modules is generated according to a hardware list, and the hardware list records a set of hardware components needed to be driven when the functional module is executed;

a touch-sensitive device, receiving an input command; and a processing module, coupled to the storage unit and the touch-sensitive device, executing one of the functional modules, driving a set of the hardware components corresponding to the hardware list for the executed functional module, and determining whether to generate a switch command according to the input command, wherein when the switch command is generated, the processing module terminates the functional module currently being executed, stopping and releasing the corresponding set of the hardware components, and directly switches to execute another functional module and drive a set of the hardware components corresponding to the hardware list for the executed another functional module, wherein selection for the functional modules via a specific menu is not required.

13. A method for switching functions for use in a device comprising a plurality of hardware components, wherein a first functional module is executed, and a first set of the hardware components are driven according a first functional connecting configuration corresponding to the first functional module, wherein the first functional module is generated according to a first hardware list, and the first hardware list records the first set of the hardware components needed to be driven among the hardware components when the first functional module is executed, and the method comprises:

(a) receiving an input command, and determining whether to generate a switch command according to the input command;

(b) when the switch command is generated, terminating the first functional module, stopping and releasing the first set of the hardware components among the hardware components, and directly executing a second functional module; and (c) driving a second set of the hardware components according to a second functional connecting configuration corresponding to the second functional module, wherein the second functional module is generated according to a second hardware list, and the second hardware list records the second set of the hardware components needed to be driven among the hardware components when the second functional module is executed, wherein selection for the functional modules via a specific menu is not required.

14. The method of claim 13, further comprising calling up applications corresponding to the second functional module when the second functional module is executed, wherein parts or all of the applications correspond to at least one of the first functional module and the second functional module.

15. The method of claim 13, further comprising displaying a user interface corresponding to the second functional module after changing to the second functional module.

16. The method of claim 13, wherein step (b) further comprises:

determining whether an operating state corresponding to the second functional module exists; and if so, executing the second functional module under the operating state.

17. The method of claim 13, further comprising recording an operating state corresponding to the first functional module before the first functional module is terminated.

18. The method of claim 13, wherein step (a) comprises:

generating the switch command when the input command is specific vector data, direction data, contact track or voice data comprises specific recognition data, or when the input command is inputted by selection of at least one hot key.

19. A method for switching functions for use in a device comprising a plurality of functional modules, wherein each of the functional modules is generated according to a hardware list, and the hardware list records a set of hardware components needed to be driven when the functional module is executed, one of the functional modules is executed, and a set of the hardware components corresponding to the hardware list is driven for the executed functional module, and the method comprises:

receiving an input command;

determining whether to generate a switch command according to the input command; and when the switch command is generated, terminating the functional module currently executed, stopping and releasing the corresponding set of the hardware components, and directly executing another functional module and driving a set of the hardware components corresponding to the hardware list for the executed another functional module, wherein selection for the functional modules via a specific menu is not required.

* * * * *